Patented Nov. 7, 1933

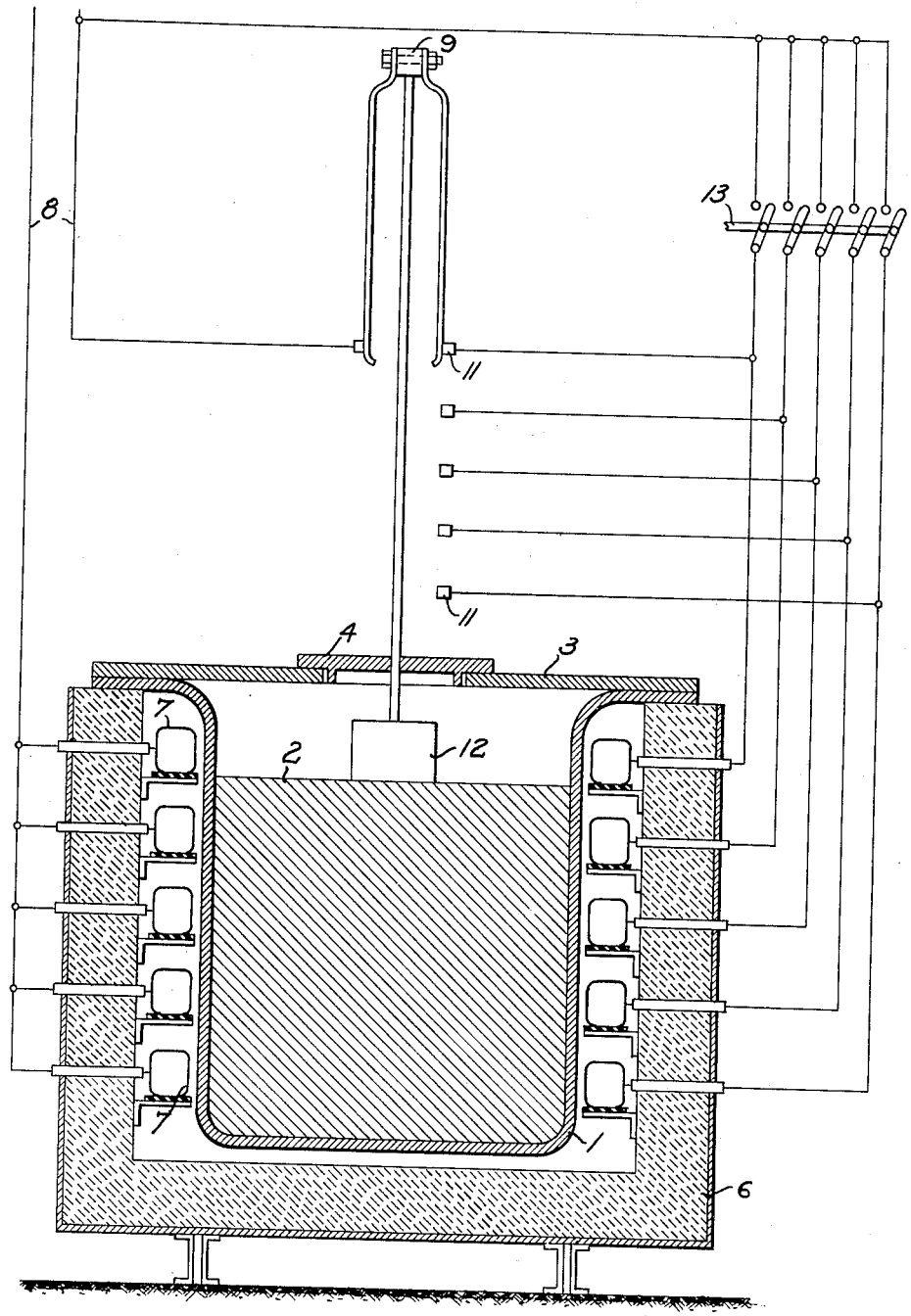

1,933,851

UNITED STATES PATENT OFFICE 1,933,851

ELECTRIC FURNACE

Randolf Gränzer, Mannheim, Germany, assignor to Aktiengesellschaft Brown Boveri & Cie., Baden, Switzerland, a joint-stock company of Switzerland Application March 10, 1932, Serial No. 597,894, and in Germany March 13, 1931

5 Claims. (Cl. 219—44)

This invention relates to improvements in melting pots and particularly to means for progressively connecting the heating elements of such pots in response to the degree of fusion of the material to be melted.

Melting pots for materials such as zinc or lead, when allowed to cool when filled, may be damaged or even destroyed when the heating elements or means are reconnected for the reason that the material in the bottom of the pot will melt first and will expand while the upper portion of the material, and particularly the surface portion thereof, remains solid. The solid upper portion of the zinc or lead remains firmly attached to the sides of the pot and resists the expansion of the lower fluid portion thus causing distortion or destruction of the melting pot, depending on the construction thereof.

Damage to a melting pot may be prevented if the heating elements are arranged in such manner as to provide for heating of only a portion of the pot by each element, and if the heating elements are successively reconnected from the top of the pot toward the bottom as the material within the pot is melted.

It is, therefore, among the objects of the present invention to provide a melting pot for material to be fused in which the heating elements are progressively connected in response to the degree of fusion of the material to be melted.

Another object of the invention is to provide a melting pot for materials to be fused in which the heating elements are so arranged that the heating effect of each element is substantially concentrated on one portion of the pot and in which means are provided for connecting the heating elements successively in response to the degree of fusion of the material to be melted.

Objects and advantages other than those above set forth will be apparent from the following description when read in connection with the accompanying drawing, which somewhat schematically illustrates one embodiment of the invention as applied to a melting pot with electrical heating elements divided into individual elements in a horizontal direction and provided with means for progressively connecting the heating elements from the top toward the bottom of the pot in dependence on the degree of fusion of the material.

Referring more particularly to the drawing by characters of reference, the reference numeral 1 designates a melting pot containing a material 2 such as zinc to be fused and provided with a cover 3. The cover 3 is preferably provided with heat insulation (not shown) and is arranged with a central opening therethrough, which opening is provided with a cover plate 4. The pot is arranged in spaced relation within a heat insulated container 6 in such manner that a plurality of electric heating elements 7 may be arranged between the pot and the container. The heating elements are preferably arranged about the pot horizontally so that the heating effect of each element is substantially concentrated on a horizontal section of the pot, all of the heating elements being required to secure complete heating of the pot and hence fusion of the material retained therein.

The heating elements are arranged to be progressively connected with an electric supply line 8, beginning with the upper element, by means of a contactor member 9, the contactor 9 being continuously in contact with one conductor of the line 8 and successively making contact with the several contacts 11 of the individual heating elements 7. The contacts 11 are arranged in the same series or sequence as the heating elements 7 are arranged, i. e. the contact 11 for the upper heating elements 7 is arranged in the uppermost position and the contact 11 for the lower heating element 7 is arranged in the lowermost position. Although a contactor moving in a straight line has been illustrated in the drawing, it will be apparent that any other type of contactor such as a rotary contactor may be used, provided only that the contactor be of such character as to retain contact with the line 8 and with each of the heating elements contacts 11 as soon as such contact has been made.

When the zinc 2 is cooled and is to be fused, a weight member 12 is placed on the surface of the zinc through the central opening in the cover 3 and the opening is then closed by plate 4. The contactor 9 then makes contact between the line 8 and one of the contacts 11 of the heating elements 7 dependent on the height of the zinc within the pot. Regardless of the height of the zinc, the heating elements above and at the surface of the zinc are thus connected at the same time. As the zinc is fused, the weight 12 sinks through the fused material and the contactor 9 is moved downwardly to connect the lower heating elements successively with the line. The heating elements are thus progressively connected with the line 8 until the weight rests on the bottom of the pot 1. When the zinc is completely fused, the heating elements are all connected with the line 7 by means of a switch 13 and the weight 9 and contactor 8 are removed from the pot, thus permitting free access to all of the fused material within the pot while such material is retained in the fused condition.

It will, of course, be understood that the contactor 9 may be operated by other suitable means such as a clock-work to connect the several heating elements successively to the line at a certain time instead of in response to the fused condition of the material as above stated.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. A furnace for fusing materials and comprising a heat conductive pot retaining material to be fused, a heat insulating container arranged in spaced relation about said pot, heating elements arranged between said pot and said container, a source of heating energy, and means for successively connecting said elements with said source in response to the degree of fusion of the material.

2. A furnace for fusing materials and comprising a heat conductive pot retaining material to be fused, a heat insulating container arranged in spaced relation about said pot, separate heating elements arranged above each other between said pot and said container, a source of heating energy, and means for successively connecting said elements with said source from the upper of said elements downwardly.

3. A furnace for fusing materials comprising a heat conductive pot retaining material to be fused, a heat insulating container arranged in spaced relation about said pot, heating elements arranged between said pot and said container, a source of heating energy, each of said elements having a contact for individual connection with said source, and a contactor for progressively connecting said elements with said source in dependence on the degree of fusion of the material retained within said pot.

4. A furnace for fusing materials comprising a heat conductive pot retaining material to be fused, a heat insulating container arranged in spaced relation about said pot, heating elements arranged between said pot and said container, a source of heating energy, each of said elements having a contact for individual connection with said source, a contactor for connecting said elements in sequence with said source, and a weight resting on the solid portion of the material within said pot for operating said contactor.

5. In a furnace for converting materials from the solid to the liquid state, a receptacle, material to be converted from the solid to the liquid state retained within said receptacle, a plurality of heating elements arranged about said receptacle, a source of energy for heating said elements to cause said conversion, and means for successively applying energy from said source to said elements operable responsive to and in dependence upon change in height of the solid portion of said material during conversion thereof to the liquid state.

RANDOLF GRÄNZER.